United States Patent [19]
Griffin

[11] Patent Number: 6,116,562
[45] Date of Patent: Sep. 12, 2000

[54] PORTABLE MAGNIFIER STAND

[76] Inventor: Marguerite Griffin, 1432 W. 36th St., Erie, Pa. 16508-2312

[21] Appl. No.: 09/136,173

[22] Filed: Aug. 19, 1998

Related U.S. Application Data

[60] Provisional application No. 60/056,520, Aug. 21, 1997.

[51] Int. Cl.[7] ............................ A47B 11/32; A47B 23/00; A47B 97/04; G02B 27/02
[52] U.S. Cl. ........................................ 248/444.1; 359/807
[58] Field of Search ........................... 248/441.1, 444.1, 248/176.1; 400/718; 40/661; 359/804, 807, 811, 813; 281/45, 51

[56] References Cited

U.S. PATENT DOCUMENTS

| | | | |
|---|---|---|---|
| 632,026 | 8/1899 | Smith | 359/807 X |
| 1,395,999 | 11/1921 | Seese | 40/661 X |
| 1,702,317 | 2/1929 | Rose | 359/807 |
| 1,892,745 | 1/1933 | Bolich | 359/807 X |
| 2,051,791 | 8/1936 | Luce | 359/811 X |
| 2,056,693 | 10/1936 | Stanley | 359/811 X |
| 2,876,674 | 3/1959 | Ohlhaver | 359/807 |
| 4,163,497 | 8/1979 | McEwen . | |
| 4,496,127 | 1/1985 | Nelson . | |
| 4,552,382 | 11/1985 | Cowden . | |
| 4,685,647 | 8/1987 | Calhoun . | |
| 5,058,848 | 10/1991 | Ferraro | 248/444.1 |
| 5,113,289 | 5/1992 | Soper | 359/811 |
| 5,318,265 | 6/1994 | Anderson . | |
| 5,351,927 | 10/1994 | Howell | 248/444.1 |
| 5,610,770 | 3/1997 | Galiani | 281/45 X |

FOREIGN PATENT DOCUMENTS

| | | |
|---|---|---|
| 443125 | 2/1936 | United Kingdom . |

*Primary Examiner*—Ramon O. Ramirez
*Assistant Examiner*—Jerome A. DeLuca
*Attorney, Agent, or Firm*—Edward W. Goebel, Jr.; MacDonald, Illig, Jones and Britton LLP

[57] ABSTRACT

The present version of the invention relates to the field of reading stands in general. This version of the invention discloses a portable stand that provides a magnifier for either writing or reading so that the user can engage in either activity and be afforded magnification of the written or printed page in a variety of locations and circumstances. The invention consists of a side support member, rear support member, and magnifying panel. The panel and support embers are manufactured of material that is clear, durable, scratch resistant, and rigid, such as acrylic or the like. The support members are rectangular in shape and are formed with a plurality of mounting grooves that run in parallel along the longitudinal axis of the support members. The side support member is formed with a retaining groove placed near the vertical or shorter edge of the member for receipt of the rear support member in tongue and groove fashion. The magnifying panel is inserted into the appropriate mounting grooves and retained therein for the appropriate activity, such as writing and reading. For writing, the magnifying panel is inserted in the grooves farthest from plane of the writing surface to accommodate the writing hand and writing instrument. For right-handed writers, the side support member is placed to the left of the writing hand; for left-handed writers, the magnifying panel is removed and the joined support members are turned over so that the side support member is placed to the right of the writing hand. The magnifying panel is inserted into the appropriate mounting grooves.

28 Claims, 3 Drawing Sheets

PORTABLE MAGNIFIER STAND

This application claims the benefit of U.S. Provisional Application No. 60/056,520 filed on Aug. 21, 1997.

BACKGROUND

This version of the invention is concerned with the field of reading stands in general. More specifically, this version of the invention is concerned with a portable stand that provides a magnifier for either writing or reading so that the user can engage in either activity and be afforded magnification of the written or printed page in a variety of locations and circumstances.

Writing and reading text is frequently hindered by the inability of the person performing either task to adequately see the material, usually a writing tablet or sheet, printed page of text, or the like. This incapacity is usually the result of relatively small or otherwise illegible printed matter or typeface, performance of activities at a distance from the printed material, or a shortcoming in vision.

It is common for some people to have difficulty in writing because of their inability to see the text they are attempting to write or edit. This occurrence is usually the result of vision shortcomings of the type found in farsighted and older people. People who wear glasses to correct their vision for close work nevertheless sometimes misplace or otherwise do not have the glasses available when needed.

Many printed materials are difficult to read because of typeface sizes that are legible at only a relatively close distance, usually the distance from desktop to eye level when the reader is seated in a chair at a typical desk. Should the reader be required to leave the chair or engage in work that requires movement around or to and from the desk, the printed material usually becomes unreadable.

These problems are exacerbated if writing and reading is attempted in circumstances and locations outside of the home or work office where the normal ergonomics provided by office and home furniture is unavailable and modes of reading and writing do not follow usual patterns.

Attempting to overcome the aforementioned difficulties has resulted in a variety of writing and reading tools. Writing tools usually take the form of a device consisting of a rectangular box that is designed to fit onto the desktop and is inclined at a slight angle. The origin of the angle is nearest to the writer so that the plane of the writing surface increases in height as the distance from the written increases. In most designs, the writing tool only provides an inclined writing surface with no magnification capability. These designs are typically bulky and do not possess portable features that allow for ease of disassembly, storage, transport, and assembly.

In the case of a reading stand, otherwise known as a book stand, the tool takes the form of a modified easel upon which an open book rests in an open position with its covers placed against and secured to the easel. The open pages are overlaid with a transparent member that is releasably attached to the easel assembly. The transparent member is pressed against the open pages of the book, thereby maintaining the open pages in a fixed position for viewing. In some cases, the transparent member may provide magnification so that the open pages may be read from some distance.

In either case, the writing and reading tool is dedicated to only one of these activities. The existence of a tool designed to accommodate both activities is unknown at the present time. For example, numerous designs for magnifying stands have been provided in the prior art. Even though these designs may be suitable for the specific individual purposes to which they address, they would not be suitable for the purposes of the present version of the invention. For instance, U.S. Pat. No. 4,496,127, issued to Nelson on Jan. 29, 1985; U.S. Pat. No. 4,552,382, issued to Cowden on Nov. 12, 1985; and U.S. Pat. No. 4,685,647, issued to Calhoun on Aug. 11, 1987. In Nelson, an adjustable book holder with magnifying front panel is disclosed that consists of a transparent rear member and a front member. Each member is comprised of a base and a panel that rises upwardly in relation to the base at an angle of less than 90 degrees. The base of the rear member rests on the base of the front member and supports the open book in the inclined position afforded by the angle of the upward panel. The rear member in the state of supporting the book is pressed to the front member to retain the book in the open position. The rear member and the book are secured to the front member by complementary rows of teeth that lock into position. Several rows of teeth on the bottom of the base of the rear member are mated to several rows of teeth on the top of the base of the front member. The complementary rows of teeth provide the book stand with the ability to maintain books of varying thicknesses in the open position. A magnifying lens can be formed of the upward panel of the front member.

In Cowden, a book holder with magnified viewing window is disclosed consisting of a support member and a magnifying member. Each member is comprised of a semi-rigid transparent material. The support member is configured from a single sheet of said material so that it is comprised of three sides roughly resembling a triangle. The side of the support member at the rear in relation to the viewing side is configured into a lip at its distal edge. The rear side extends to and terminates into a base that rests upon the reading surface. The base extends to and terminates into a support panel that extends upward at approximately the angle of the rear side. The height of the support panel is designed to accommodate the typical book when opened. As a result, a gap is formed between the lip of the rear side and the support panel. An open book is placed into the gap for viewing. Magnification is accomplished by attaching a magnifier over the book onto the support panel.

In Calhoun, a magnifying reading stand is shown that is comprised of several members designed to maintain a book in an open position and provide magnification. This disclosure reveals a base member with a plurality of grooves perpendicular to the longitudinal axis of the member. The base member is maintained at an inclined position by an angled support member releasably attached to the underside of the base member. A support member and placement member are inserted into respective grooves near the edge of the base member opposite to the edge proximate to the angled support member. An opened book is inserted into the gap formed between the support member and the placement member. A magnifying member is positioned onto the base member at some distance from the book that is maintained in the open position by the aforementioned support and placement member.

While each of these disclosures provides a means to retain a book in an open position and magnify the opened pages for reading over various distances, they do not provide the functions of a writing stand, allowing writing to be accomplished and magnified as needed. Furthermore, they retain a bulky configuration as evidenced by the methods used to accomplish the upright positioning of the open book, which usually involve a one piece support member consisting of a base and an upright support panel. This bulk increases as the number of components increase. As a result, the portability and versatility of such stands is limited.

As such, it may be appreciated that there is a continuing need for a combination writing and reading magnifying stand. A means of meeting this need and overcoming the aforementioned disadvantages is the manufacture of a combination writing and reading magnifying stand that is easy to use, low cost, versatile and portable. In these respects, the present version of the invention substantially departs from the conventional concepts and designs of the prior art, and in so doing provides an apparatus that substantially fulfills this need.

SUMMARY

The present version of the invention, which will be described in greater detail hereinafter, relates to the field of reading stands. More specifically, this version of the invention is concerned with a portable stand that provides a magnifier for either writing or reading. My version of the invention overcomes all of the shortcomings listed previously, in addition to novel aspects that will be described in detail hereinafter.

Described briefly, according to a typical embodiment, the present version of the invention presents a combination writing and reading magnifying stand that consists of a side support member joined tongue and groove at a right angle to a rear support member that together form an L-shaped support assembly. In this description, the designation side support member is used to denote the support member nearest to the user, and the rear support member is used to denote the support member farthest from the user. Each support member is rectangular in shape with the longer side of the members designed to rest on the writing or reading surface and possessing a length able to equal or exceed most writing sheets, tablets, books, or other printed material. The shorter side of each support member is designed for a height sufficient to accommodate the height of a typical writing instrument such as pen or pencil during the act of writing. The said groove is formed into the side support member parallel to the axis of the shorter side of the support member in proximity to an edge of said support member. The support members are manufactured of rigid transparent material, such as acrylic, Plexiglas or the like. The joined support members are positioned onto the surface of a desktop, workstation, table, or the like for writing and reading.

A plurality of grooves formed at the same location in each support member fully extend along the longitudinal axis of the support members in parallel to the support surface. The grooves of each support member unite at the angle of joining of each support member so that a series of continuous grooves extending from the distal edge of one support member to the distal edge of the opposite support member is formed A rigid transparent magnifying panel manufactured of acrylic or the like and square or rectangular in shape is inserted into one of the continuous grooves formed by the joining of the support members. One corner of the magnifying panel is rounded and is inserted into the support members, so that it is exposed. The plurality of continuous grooves allows the magnifying panel to be positioned at proximity to the support surface, at proximity to the top of the support members farthest from the support surface, or a plurality of positions therebetween. When writing is being performed, the magnifying panel will typically be inserted into a continuous groove allowing it to be positioned at some distance farther from the support surface, allowing enough clearance to accommodate a writing utensil to be grasped and manipulated during the act of writing and occurring between the support surface and the underside of the magnifying panel. Magnification can be varied levels of by use of different panels having varying magnification.

In another embodiment of this version of the invention, the magnifying panel consists of a center magnifying portion that is rigid and possesses the aforementioned properties of the rigid material and an outer edge or trim of a soft resilient or deformable material such as rubber or soft plastic that allows ease of handling for many different users under a variety of circumstances.

During writing, the present version of the invention can accommodate either right-handed or left-handed writers. In the case of a right-handed writer, the support member with the joining groove is positioned to the left of the arm and hand of the writer, and the rounded corner of the magnifying panel is positioned to the right of said arm and hand. As such, an opening of sufficient height between the writing surface and the underside of the magnifying panel extends from the rounded corner of the magnifying panel to the corner of the magnifying panel at the distal edge of the rear support member. To accommodate a left-handed writer, the magnifying panel is removed from one of the continuous grooves into which it has been positioned, the joined support members are turned over so that the side support member is to the right of the arm and hand of the writer and the aforementioned opening is to the left of said arm and hand, and the magnifying panel is inserted into the appropriate continuous groove.

During reading, an open book, magazine or other printed material is positioned under and within the enclosure of the support members so that the magnifying panel covers the printed material. The magnifying panel is placed into a continuous groove that provides the appropriate magnification.

The portable features of the invention are displayed by disengaging the magnifying panel from the support members and then disengaging the support members. The magnifying panel and said support members are flat and therefore can be easily stored, transported, and reassembled, requiring a minimum of space for each activity.

My invention, therefore, resides not in any one of these features per se, but rather in the particular combination of all of them herein disclosed. It is distinguished from the prior art in this particular combination of all of its structures for the functions specified.

There has thus been outlined, rather broadly, the more important features of the invention in order that the detailed description thereof that follows may be better understood, and in order that the present contribution to the prior art may be better appreciated. There are, of course, additional features of the invention that well be described hereinafter.

Accordingly, it is an object of my version of the invention to provide a low-cost, easy-to-manufacture, and easy-to-market writing and reading magnifying stand.

A further object of my version of the invention is to provide an easy-to-use, versatile, portable writing and reading magnifying stand that can be easily disassembled, stored, transported, and reassembled while requiring a minimum of space in each activity.

A significant object of the invention is a provide a writing and reading stand that can be used by either right-handed or left-handed writers.

A final but very significant object of the invention is to provide a combination writing and reading magnifying stand that can be used for either function.

Additional objects and advantages of my version of the invention will become apparent from a consideration of the following drawings and descriptions described herein.

BRIEF DESCRIPTION OF THE DRAWINGS

The foregoing and other objects, features and advantages of the invention will become more fully understood from the following description of the preferred embodiment of the invention as illustrated in the accompanying drawings in which like reference characters refer to the same parts throughout different views. The drawings are not necessarily to scale, emphasis instead being placed upon illustrating the principles of the invention.

DRAWING REFERENCE NUMERALS

10 Portable Magnifier Stand
12 Side Support Member
14 Rear Support Member
16 Magnifying Member
18 Longitudinal Edge of Side Support Member
20 Longitudinal Edge of Side Support Member
22 Vertical Edge of Side Support Member
24 Vertical Edge of Side Support Member
26a Mounting Groove of Side Support Member
26b Mounting Groove of Side Support Member
26c Mounting Groove of Side Support Member
26d Mounting Groove of Side Support Member
28 Retaining Groove of Side Support Member
30 Longitudinal Edge of Rear Support Member
32 Longitudinal Edge of Rear Support Member
34 Vertical Edge of Rear Support Member
36 Vertical Edge of Rear Support Member
38a Mounting Groove of Rear Support Member
38b Mounting Groove of Rear Support Member
38c Mounting Groove of Rear Support Member
38d Mounting Groove of Rear Support Member
40 Edge of Magnifying Member
42 Edge of Magnifying Member
44 Edge of Magnifying Member
46 Edge of Magnifying Member
48 Rounded Corner of Magnifying Member
50 Writing Tablet or Sheet
52 Writing Hand

DESCRIPTION OF THE PREFERRED EMBODIMENTS

Figure 1:
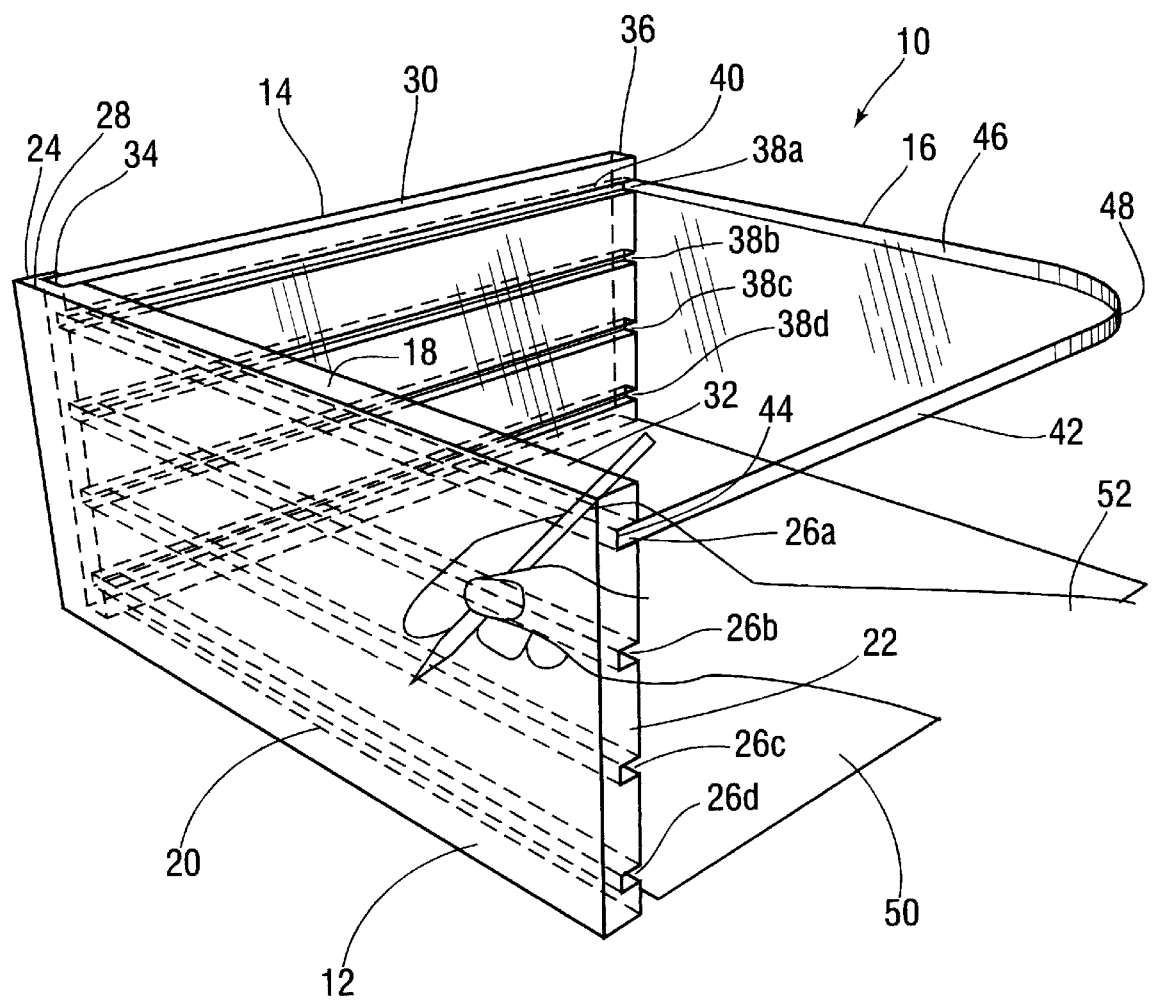
FIG. 1 is a perspective view of the present version of the invention illustrating use of the invention during writing with a right-handed writer.

Referring now to the drawings and, in particular, to FIG. 1 wherein there is illustrated a typical embodiment of the writing and reading magnifying stand 10. The present version of the invention 10 consists of a side support member 12, rear support member 14 and magnifying member 16. In this description, the designation side support member is used to denote the support member nearest to the user, and the rear support member is used to denote the support member farthest from the user. The members 12, 14, 16 are manufactured of a transparent rigid material, such as acrylic or the like. The material should be durable, scratch resistant, clear, and not distort the images of the printed or written material. This requirement is especially critical for the magnifying member, which should be able to magnify the printed or written material without distortion or deformation. The side support member 12 is rectangular in shape so that during intended use its longitudinal edges 18, 20 are parallel to the plane of the writing or reading material 50 resting on the writing or reading surface, such as a desktop, table, workstation, or the like. The shorter or vertical edges 22, 24 of the side member 12 are perpendicular to said plane of the writing or reading material 50 on the writing or reading surface.

A plurality of mounting grooves 26a, 26b, 26c, 26d are placed into the side support member 12. The mounting grooves extend along the longitudinal axis of the side support member and are parallel to each other and the longitudinal edges 18, 20 of the side support member. Proximate to one of the vertical edges 22, 24 of the side support member in parallel, in this illustration vertical edge 24, a tongue and groove joint retaining groove 28 is provided for receiving the rear support member 14 at a right angle so that the two members join to form an L-shaped support assembly. The width of the retaining groove 28 and rear support member 14 are sized to ensure that the two support members are joined into a snug fit that supports the intended use of the invention while permitting ease of disassembly.

The rear support member 14 is also rectangular in shape with longitudinal edges 30, 32 parallel to the plane of the writing or reading material 50. The vertical edges 34, 36 of are perpendicular to said plane of the writing or reading material 50 on the writing or reading surface. Mounting grooves 38a, 38b, 38c, 38d are provided.

Figure 2:
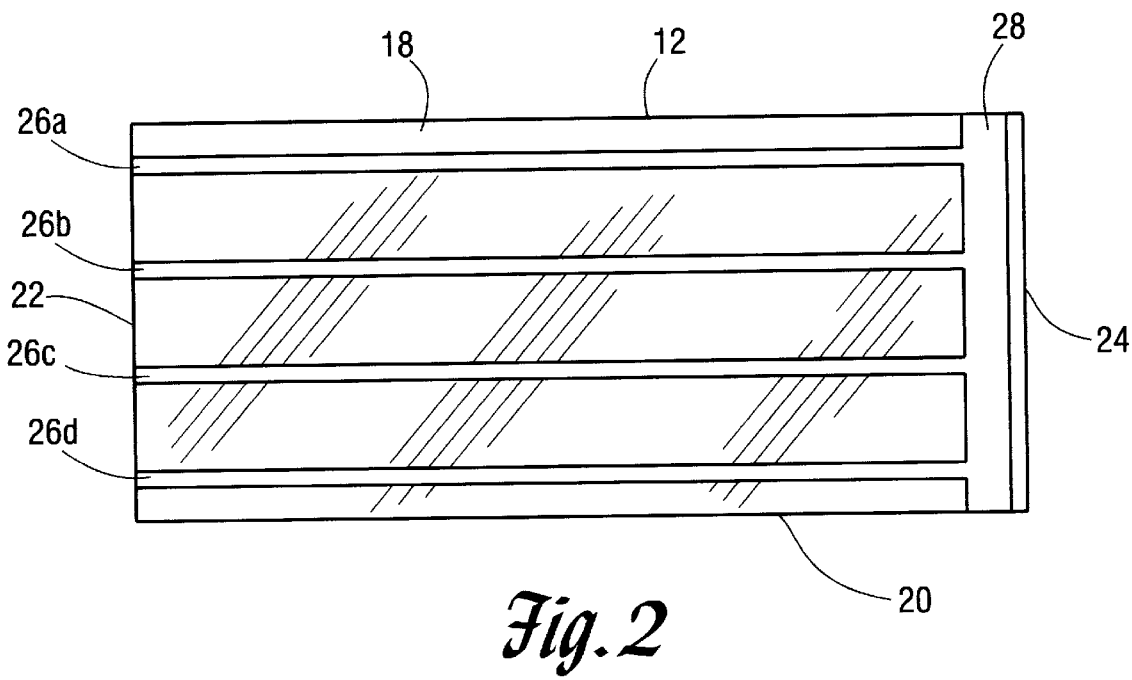
FIG. 2 is an elevation view of the side support member illustrating the parallel horizontal retaining grooves and tongue and groove joining groove.
Figure 3:
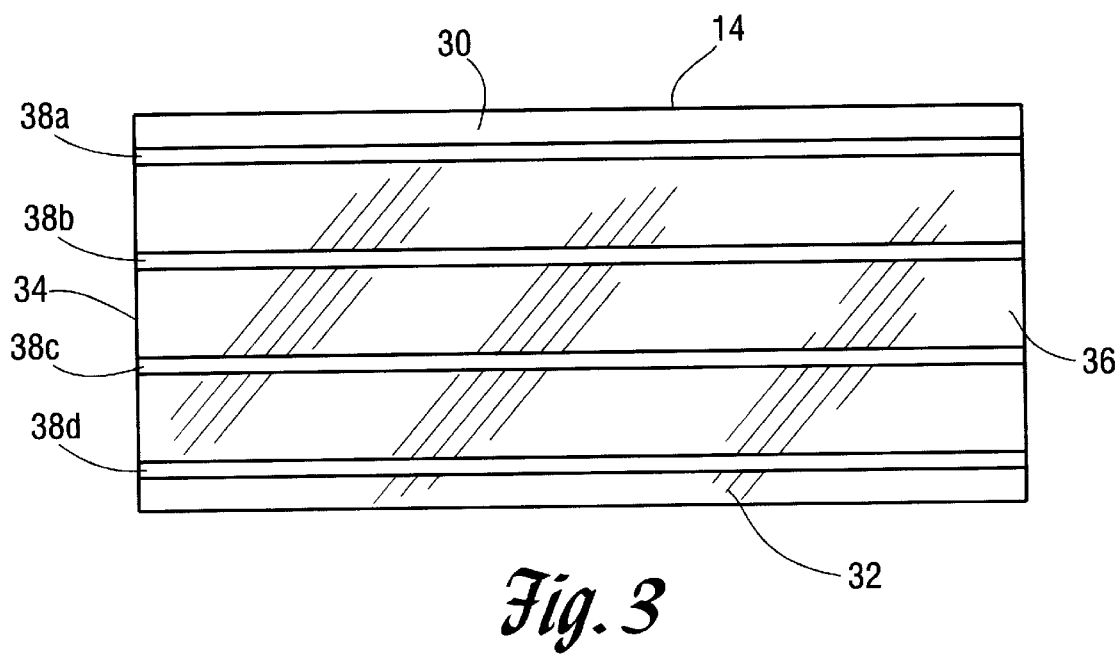
FIG. 3 is an elevation view of the rear support member illustrating the parallel horizontal retaining grooves.

Referring to FIG. 2, there is illustrated an elevation view of the side support member 12, revealing the relationship of the mounting grooves 26a, 26b, 26c, 26d to the retaining groove 28. In FIG. 3, the rear support member 14 is displayed in elevation view revealing mounting grooves 38a, 38b, 38c, 38d, which conjoin respectively to the mounting grooves of the side support member 12 to form a plurality of continuous grooves once the side support member and rear support member are joined at the tongue and groove joint.

The mounting grooves are spaced apart from each other so that a variety of magnifying positions are available to accommodate the activity and needs of the user. For instance, when the invention is used for writing, the magnifying panel would typically be inserted into a continuous groove 26a, 38a at the uppermost region of the support members. For reading, an open book, magazine or other printed material is positioned under and within the enclosure or the support members so that the magnifying panel covers the printed material. The magnifying panel would be inserted into the continuous groove 26a/38a, 26b/38b, 26c/38c, 26d/38d that provides the appropriate magnification.

Figure 4:
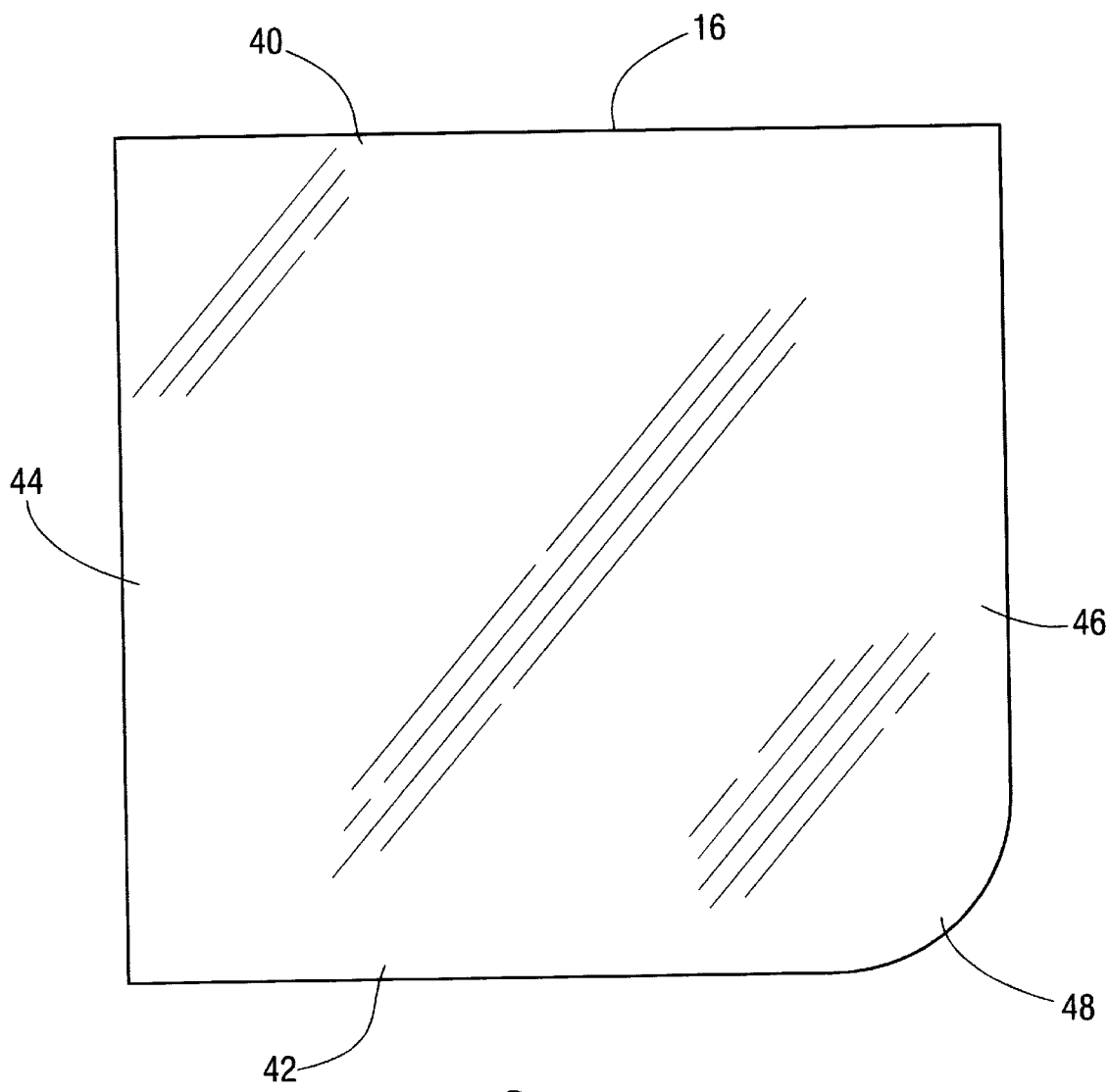
FIG. 4 is a plan view of a square magnifying panel.

In FIG. 4 therein illustrated is an elevation view of the magnifying member 16. The magnifying member is approximately square in shape consisting of four edges 40, 42, 44, 46 of similar lengths. At one corner, the magnifying member is provided with a rounded corner 48 that projects a safe non-scratching surface to the writer and reader as this is the only corner exposed during use of the invention. The thickness of the magnifying panel is sized so that the panel can be inserted into the mounting grooves of the support member with a snug fit that retains the panel within the grooves and allows ease of disengagement.

In alternate embodiments of this version of the invention, the magnifying member is rectangular in shape or consists of a center magnifying portion that is rigid and possesses the aforementioned properties of the rigid material and an outer edge or trim of a soft resilient or deformable material such as rubber or soft plastic that allows ease of handling for many different users under a variety of circumstances.

Referring again to FIG. 1, there is illustrated one of the intended uses of the present version of the invention, in this case a user writing right-handed with the magnifying panel. In this configuration, the side support member 12 is positioned to the left of the right hand of the writer 52. The side support member 12 is joined to the rear support member 14 at the retaining groove 28 of the tongue and groove joint. The magnifying panel 16 is inserted into and maintained in the upper continuous groove 26a, 38a which is most amenable for the writing position. The hand of the writer 52 would typically enter the writing surface under the space at some distance from either side of the rounded corner 48 of the magnifying panel. To accommodate the left-handed writer, the user would disengage the magnifying panel 16 from continuous mounting groove 26a, 38a, turn the joined support members over on their side so that mounting grooves 26d, 38d are farthest from the plane of the writing surface 50 and mounting grooves 26a, 38a are closest to said plane. In this configuration, the side support member 12 would be positioned to the right of the writing hand with the rounded corner 48 of the magnifying panel in the appropriate position.

The modular design of the invention provides portability and ease of disassembly, storage, transport and assembly. Disassembling the invention only requires that the user pull the magnifying member and support members apart and place them face down, one on top of the other. In this manner they can be stored and transported with minimal space requirements and reassembled with the same ease.

While this version of the invention has been illustrated and described in detail in the drawings and foregoing description the same is to be considered as illustrative and not restrictive in character, it being understood that only the preferred embodiment has been shown and described and that all changes and modifications that come within the spirit of the version of the invention are desired to be protected.

Those skilled in the art will recognize that one or more of the features of the preferred embodiment of this invention described above can be modified or eliminated within the scope and spirit of this invention as defined in the claims. By way of example, for some applications of this invention the rear member could be made wide enough to accommodate writing or reading materials and a person's hand beneath the magnifying member while adding a third side support member. The third side support member could be either as long as the side support member 12, or possibly shorter than it. For other applications of this invention, it may be advisable to utilize a pair of additional, short support members attached to the vertical edge 36 of the rear support member 14 and/or the vertical edge 22 of the side support member 12. In any event, sufficient room must be provided to enable the user to write or paint or handle reading material beneath the magnifying member 16 and within the support members, while retaining an ease of disassembly.

The preferred embodiment shows a tongue and groove arrangement forming a joint between the vertical edge 34 of the rear support member 14 and the retaining groove 28 of the side support member 12 to join the rear support member 14 to the side support member 12. Obviously, the retaining groove could be cut in the rear support member 14 and the vertical edge 24 of the side support member 12 could be inserted into it. For additional strength, the retaining groove 28 could be cut in a wedge shape and the vertical edge 34 configured to fit within that groove. As a result, the rear support member would be attached to the side support member by causing the bottom of the wedge shaped vertical edge 34 to be inserted into the top of the joint retaining groove 28. Here, too, the retaining groove could be cut in the rear support member 14 and the vertical edge 24 of the side support member 12 could be configured to fit it. Alternatively, a joint could be formed between the rear support member 14 and side support member 12 to detachably join them together using screws, with or without a tongue and groove arrangement. Or they could be detachably joined together with a joint comprising L shaped support corners or other appropriate supports attached by screws, allowing an ease of disassembly.

While it is normally preferable to attach the rear support member to the side support member at a 90° angle, for some applications of this invention it may be desirable to join them together at some other angle either somewhat greater or somewhat lesser than 90°. The preferred embodiment suggests the use of a rigid transparent material such as acrylic, Plexiglas or the like. However, it is possible to use other types of plastic or synthetic materials for the side support member 12 and the rear support member 14, or to use a suitable type of wood to construct them.

The preferred embodiment of my invention includes a plurality of mounting grooves 38a–38d in the rear support member 14 which join, respectively, to a plurality of mounting grooves 26a–26d in the side support member 12 to form a plurality of continuous grooves by which the magnifying member 16 is held. For some applications of this invention, it may be preferable to use only a single mounting groove in the rear support member 14 and the side support member 18 as fastening devices for holding the magnifying member 16 to the rear support member 14 and the side support member 12, rather than utilizing a plurality of mounting grooves. It may be desirable to round off not only the corner 48 of the magnifying member 16, but also the opposite corner of the magnifying member. As a result, the grooves on the rear support member 14 would not have to be continuous with the grooves on the side support member 12 to enable the magnifying member 16 to be properly installed in the portable magnifier stand 10. By way of example, if desired the mounting groove 38a and mounting groove 26a would not have to extend all the way to the vertical edges 34 and 24, respectively, as long as the corner of the magnifying member 16 opposite the rounded corner 48 was sufficiently rounded or cut off so as to allow the grooves 38a and 26a to adequately fasten the magnifying member 16 to the side support member 12 and the rear support member 14.

It is preferable to use grooves such as 38a–38d and 26a–26d to detachably hold the magnifying member 16 to the side support member 12 and the rear support member 14. However, those skilled in the art will recognize that other types of fastening devices could be used in place of the grooves for this purpose. Alternative fastening devices could include one or more U-shaped clips or strips fastened to the rear support member 14 and/or the side support member 12 in place of each of the mounting grooves to detachably fasten the magnifying member 16 to the side support member 12 and the rear support member. Additionally, while it is preferable to have the magnifying member 16 mounted parallel to the support surface on which the portable magnifier stand is placed, the grooves or other fastening devices of the side support member 12 could be cut at an angle sloping downward from the rear support member 14. The magnifying member 16 would be supported at an angle tilted somewhat downward from the rear support member 14. With this type of arrangement, the grooves in the rear support member 14 would also have to be adjusted to accommodate the orientation of the edge 40 of the magnifying member 16 caused by the angle at which the magnifying member 16 is installed. Alternate fastening devices for the magnifying member 16, such as U-shaped clips or screws, could also be oriented at a proper slope to attach the magnifying member 16 at an angle which is not parallel to the plane of the support surface for the portable magnifier stand.

Thus, while this invention has been explained with respect to the details, arrangements of components and specific embodiment shown in the accompanying drawings, modifications can be made to this preferred embodiment by those skilled in the art without departing from the scope and spirit of this invention. The appended claims are intended to be interpreted to cover such equivalent portable magnifier stands which do not depart from the spirit and scope of this invention.

CONCLUSION AND SCOPE OF INVENTION

From the foregoing, it will be understood by persons skilled in the art that an improved writing and reading magnifying stand has been provided that provides the user to write either right-handed or left-handed with magnification, read a variety of printed and written material, and disassemble, store, transport, and reassemble the invention with relative ease. The invention is relatively simple and easy to manufacture, yet affords a variety of uses. While my description contains many specificities, these should not be construed as limitations on the scope of the version of the invention set forth in the claims, but rather as an exemplification of the preferred embodiments thereof.

I claim:

1. A magnifying stand which can be stood on a support surface separate from the magnifying stand comprising:
   a side support member having two longitudinal edges and having two vertical edges forming a planar surface; a rear support member having two longitudinal edges and having two vertical edges forming a planar surface; a magnifying member; the side support member and the rear support member detachably joined at an angle to one another so that an approximate vertical edge of one of the side support and rear support members can be attached approximately along either one of the two vertical edges of the other of the side support and rear support members;
   one of the longitudinal edges of the side support member and one of the longitudinal edges of the rear support member being suitable for resting on the support surface;
   the side support member and the rear support member each respectively having at least one fastening device to hold the magnifying member; and
   the fastening devices detachably holding the magnifying member to the side support member and the rear support member, so that, with the side support member and the rear support member detachably joined to one another, there is an ease of storage, transportation and reassembly of the magnifying stand.

2. The magnifying stand of claim 1 in which the side support member is detachably joined at a substantially 90° angle to the rear support member.

3. The magnifying stand of claim 1 further comprising:
   the at least one fastening device of the side support member and the rear support member is comprised of a plurality of fastening devices; and
   the plurality of fastening devices having individual fastening devices on both the side support member and the rear support member located at different heights from the support surface.

4. The magnifying stand of claim 3 wherein the plurality of fastening devices is a plurality of grooves each of which substantially fully extend along both the side support member and the rear support member so as to form a plurality of continuous grooves once the side support member and rear support member are joined.

5. The magnifying stand of claim 4 wherein the magnifying member is held on a plane parallel with the support surface.

6. The magnifying stand of claim 4 wherein there are no more than two support members.

7. The magnifying stand of claim 3 wherein there are no more than two support members.

8. The magnifying stand of claim 1 wherein the magnifying member is held on a plane parallel with the support surface.

9. The magnifying stand of claim 1 wherein there are no more than two support members.

10. The magnifying stand of claim 1 wherein the side support member is detachably joined at a substantially 90° angle to the rear support member; the magnifying member is held on a plane parallel with the support surface; and, there are no more than two support members.

11. The magnifying stand according to claim 10 wherein the side support member is detachably joined to the rear support member by a tongue and groove joint.

12. A magnifying stand which can be stood on a support surface for supporting the magnifying stand, comprising:
   a magnifying member; a side support member having two longitudinal edges and having two vertical edges; a rear support member having two longitudinal edges and having two vertical edges; the side support member detachably joined at an angle to the rear support member approximately along one of the vertical edges of the side support member and approximately along one of the vertical edges of the rear support member;
   one longitudinal edge of the side support member and one longitudinal edge of the rear support member being suitable for resting on the support surface;
   the side support member and the rear support member each respectively having at least one mounting groove for holding the magnifying member which extends in a longitudinal direction with respect to the side support member and the rear support member;
   each mounting groove of the side support member having a corresponding mounting groove of the rear support member which is at the same height with respect to the support surface so that when the side support member and the rear support member are joined together the magnifying member is held by a mounting groove of the side support member and a mounting groove of the rear support member; and
   the magnifying member having a structure such that it can be inserted into the mounting grooves of the side and rear support member with a snug fit that retains the magnifying member within the grooves and allows for ease of disengagement.

13. A magnifying stand of claim 12 in which the side support member is detachable joined at an angle to the rear support member approximately along one of the vertical edges of the side support member and approximately along either one of the two vertical edges of the rear support member.

14. The magnifying stand of claim 12 in which:

the mounting grooves extend fully across the length of the side support member and the rear support member so as to form at least one continuous mounting groove when the side support member is joined to the rear support member.

15. The magnifying stand of claim 14, wherein there are no more than two support members.

16. The magnifying stand of claim 12 in which:

the at least one mounting groove in the side support member and in the rear support member comprise a plurality of mounting grooves located at different heights with respect to the support surface.

17. The magnifying stand of claim 16 wherein there are no more than two support members.

18. The magnifying stand of claim 12 further comprising:

a tongue and groove joint which joins the side support member to the rear support member so as to be substantially perpendicular to one another.

19. The magnifying stand of claim 12 further comprising:

the side support member, the rear support member and the magnifying member being substantially rectangular so that the longitudinal edges of the side support member and the rear support member are parallel to the support surface and the vertical edges of the side support member and the rear support member are perpendicular to the support surface.

20. The magnifying stand of claim 12 wherein the magnifying member is held on a plane parallel with the support surface.

21. The magnifying stand of claim 20 wherein there are no more than two support members.

22. The magnifying stand of claim 12 wherein there are no more than two support members.

23. A magnifying stand comprising:

a side support member having two longitudinal edges and having two vertical edges; a rear support member having two longitudinal edges and having two vertical edges; a joint for detachably joining the side support member to the rear support member; a magnifying member;

at least one longitudinal edge of the side support member and at least one longitudinal edge of the rear support member being suitable for resting on a support surface;

the side support member and the rear support member each respectively having a plurality of mounting grooves; the mounting grooves of the side support member and the mounting grooves of the rear support member forming parallel mounting grooves to hold the magnifying member in a plane approximately parallel to the support surface when the side support member and the rear support member are joined together;

the magnifying member having a thickness such that it can be inserted into the mounting grooves of the side support member and rear support member with a snug fit that retains the magnifying member within the grooves and allows for ease of disengagement and, the parallel mounting grooves in both the side support member and the rear support member being spaced apart from each other vertically to hold the magnifying member at a plurality of magnifying positions.

24. A magnifying stand of claim 22 in which the joint for detachably joining the side support member to the rear support member can detachably join a vertical edge of one of the support members to each of the two vertical edges of the other support member.

25. A magnifying stand which can stand on a support surface for supporting the magnifying stand, comprising:

two support members and a joint for detachably joining the support members together; a magnifying member;

the two support members each respectively having a plurality of mounting grooves which fully extend substantially longitudinally along both support members; the mounting grooves of the two support members coming together to form a plurality of mounting grooves along both support members for supporting the magnifying member when both support members are joined together;

the magnifying member having a thickness such that it can be inserted into the mounting grooves of both members with a snug fit that retains the magnifying member within the grooves and allows for ease of disengagement; and, the mounting grooves spaced apart from each other vertically so that a plurality of magnifying positions are available.

26. The magnifying stand of claim 25 wherein there are no more than two support members for the magnifying member.

27. The magnifying stand of claim 25 wherein the magnifying member is held on a plane parallel with the support surface.

28. The magnifying stand of claim 25 wherein the two support members are joined together by a tongue and groove joint.

* * * * *